(12) United States Patent
Erickson

(10) Patent No.: US 6,715,290 B1
(45) Date of Patent: Apr. 6, 2004

(54) FLUID MIXTURE SEPARATION BY LOW TEMPERATURE GLIDE HEAT

(76) Inventor: Donald C. Erickson, 1704 S. Harbor La., Annapolis, MD (US) 21401

( * ) Notice: Subject to any disclaimer, the term of this patent is extended or adjusted under 35 U.S.C. 154(b) by 0 days.

(21) Appl. No.: 10/334,537

(22) Filed: Dec. 31, 2002

(51) Int. Cl.[7] .................. F01K 25/00; F25B 15/00; F25B 33/00
(52) U.S. Cl. .............. 60/671; 60/649; 60/653; 60/673; 62/114; 62/476; 62/495; 202/158; 202/159
(58) Field of Search .......... 60/649, 653, 670, 60/671, 673; 62/476, 495, 497, 114; 202/158, 159

(56) References Cited

U.S. PATENT DOCUMENTS

| | | | |
|---|---|---|---|
| 3,690,121 A | | 9/1972 | Patel |
| 4,307,572 A | | 12/1981 | Brinkerhoff |
| 4,418,545 A | * | 12/1983 | Markfort ............ 62/114 |
| 4,707,996 A | * | 11/1987 | Vobach ............. 62/114 |
| 4,724,679 A | * | 2/1988 | Radermacher ........ 62/114 |
| 4,962,646 A | * | 10/1990 | Rathbone ........... 62/651 |
| 5,186,012 A | * | 2/1993 | Czachorski et al. .... 62/114 |
| 5,916,258 A | * | 6/1999 | Cho ................ 62/476 |
| 6,269,644 B1 | * | 8/2001 | Erickson et al. ...... 60/649 |
| 6,357,255 B1 | | 3/2002 | Onishi et al. |
| 6,517,801 B2 | * | 2/2003 | Watson et al. ....... 423/574.1 |

OTHER PUBLICATIONS

Jurgen Langren, "Cogen Absorption Plants for refrigeration purposes and turbine air inlet cooling", Cogeneration On Site Power Production, Mar.–Apr. 2002, pp. 46–49.
Werner F. Malewski, Gunther M. Holldorff, "Power Increase of Gas Turbines by Inlet Air Pre–Cooling with Absorption Refrigeration Utilizing Exhaust Waste heat", ASME #86–GT–67, New York, NY 1986.

* cited by examiner

Primary Examiner—Sheldon J. Richter

(57) ABSTRACT

Apparatus and process for distilling a fluid mixture using low temperature glide heat are disclosed. A substantial portion of the glide heat is at a temperature lower than the peak distillation temperature. The disclosure achieves a maximal amount of distillative effect from a given heat source. Applications include absorption refrigeration and absorption power cycles. Referring to FIG. 1, column 104 and desorber 105 distill fluid in conduit 101 using low temperature glide heat. Divider 108 proportions fluid between them.

20 Claims, 5 Drawing Sheets

FLUID MIXTURE SEPARATION BY LOW TEMPERATURE GLIDE HEAT

CROSS-REFERENCE TO RELATED APPLICATIONS

One portion of this disclosure was disclosed in U.S. patent application Ser. No. 10/041,819, filed Dec. 31, 2001.

STATEMENT REGARDING FEDERALLY SPONSORED RESEARCH OR DEVELOPMENT

One portion of this disclosure was conceptualized under federal contract DEFG36-GO011045.

REFERENCE TO A MICROFICHE APPENDIX

Not applicable

BACKGROUND OF THE INVENTION

There is an increasing need to extract beneficial effect (e.g., power and/or refrigeration) from low temperature heat, which is frequently regarded as waste heat. Heat-activated absorption cycles provide exceptional promise in this regard.

Many low temperature heat sources have a temperature glide—the more heat that is extracted, the lower the temperature becomes. All sensible heat sources have that characteristic, e.g., exhaust combustion gas from an engine or furnace, hot process liquids, or geothermal liquid. Pure component latent heat (e.g., saturated steam) is isothermal, but mixed component condensation has a glide. Solar radiation may be regarded as isothermal, but once it is captured in a heat transfer fluid it has a glide.

In order to extract maximum useful effect from a glide heat source, the application process needs to accomplish two equally important objectives: the heat acceptance should have a glide comparable to that of the source, and it should reduce the source temperature a maximal amount. These two considerations respectively denote the quality and the quantity of heat input.

In principle absorption cycles excel at those two objectives, since they are thermodynamically capable of accepting heat input with temperature glide, and also of being powered by heat down to very low temperatures, e.g., less than 100° C.

However, the prior art practice in heat-activated absorption cycles does not make full use of this capability. Flame powering or steam powering has no need for it—all the heat is input at the hottest end of the hottest component of the cycle—the generator. In volatile absorbent cycles, that component is also known as the reboiler.

Prior art examples of inputting heat to absorption cycles are found in U.S. Pat. Nos. 3,690,121; 4,307,572; 6,357,255; and International Publication WO 01/94757.

With a volatile absorbent, the process of desorbing the sorbate vapor from the sorbent liquid is effectively distillation. When heat is referred to as "low temperature," it signifies that at least part of it is at a temperature below the peak distillation or desorption temperature.

In its broadest aspect, this invention discloses the distillation of a fluid mixture using low temperature glide heat. Distillation is generically useful in many applications, and this disclosure allows it to be accomplished with lower temperature heat than heretofore possible. The particular focus of this disclosure is on distillation incorporated in an absorption cycle with a volatile absorbent, and with useful effect either chilling or power.

Thus included among the objects of this invention is to achieve more beneficial distillation effect from a given low temperature glide heat source than has heretofore been possible, and in the context of an absorption cycle, to achieve more refrigeration and/or power from that source than heretofore possible.

BRIEF SUMMARY OF THE INVENTION

The above and additional useful objects are obtained by an apparatus for distilling a fluid mixture using low temperature heat comprised of:
a) a distillation column;
b) a heat recovery vapor generator (HRVG);
c) a splitter for the fluid mixture, which directs a minor fraction to the upper reflux portion of the distillation column, and the remainder to the heat recovery vapor generator;
d) a flowpath for two-phase fluid from the HRVG to the lower portion of the distillation column; and
e) a heat exchanger in the central portion of said column which is supplied column bottom liquid.

Related variants of this disclosure extend to various sensible heat recuperation schemes between column fluids, and to the use of more than one heat recovery vapor generator in series, as described further below.

DETAILED DESCRIPTION OF THE INVENTION

Figure 1:
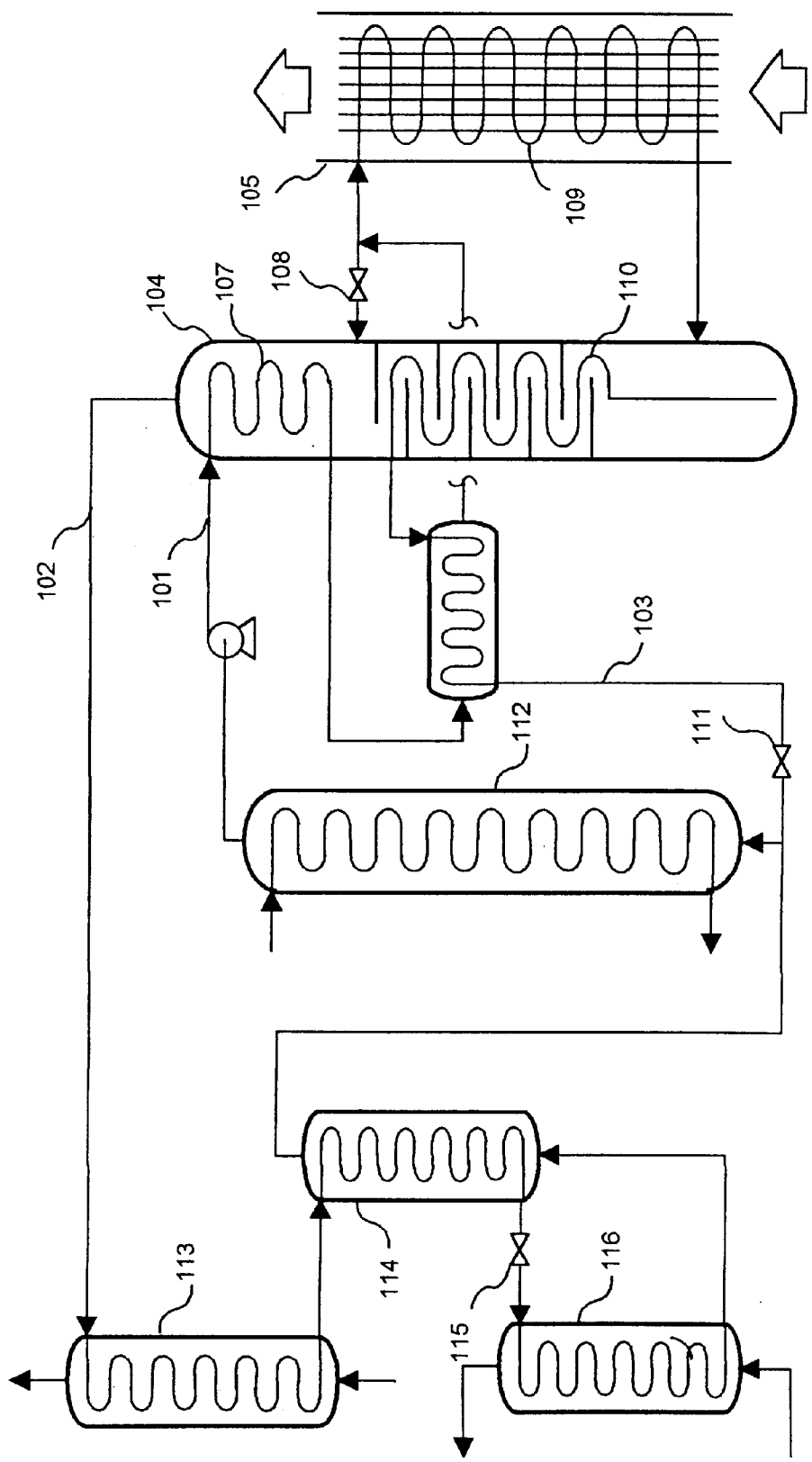
FIG. 1 illustrates a simplified flowsheet of an absorption refrigeration cycle which achieves high utilization of a low temperature glide heat source in a fin-tube desorber.

Referring to FIG. 1, inlet fluid mixture in supply line 101 is distilled to vapor in conduit 102 and bottom liquid in conduit 103 by distillation column 104, desorber (heat recovery vapor generator) 105, and solution heat exchanger 106. After preheating in solution-cooled rectifier 107 and solution heat exchanger (SHX) 106, the fluid mixture is split by valve 108 into two streams, one as feed/reflux to the column, and the other to co-current downflow desorption in desorber 105, where it exchanges heat counter-currently with low temperature glide heat. By keeping desorber 105 separate from column 104, efficient fin tubes 109 can be used to optimize heat transfer from a combustion gas. The two-phase desorbed mixture from the bottom of desorber 105 is phase separated, preferably inside column 104, where the vapor reboils the column, and the separated liquid joins column liquid and is withdrawn through generator heat exchanger (GHX) 110, where its heat causes additional reboil. After further cooling in SHX 106, the bottom liquid (strong absorbent, i.e., strong in absorbing power) is reduced in pressure by valve 111 and enters absorber 112. Vapor in conduit 102 is condensed in condenser 113, precooled in precooler 114, letdown in pressure by means for pressure reduction 115, and evaporated in evaporator 116. The mostly evaporated mixture is heated in precooler 114 with further evaporation, and the vapor is absorbed in absorber 112. Useful chilling is produced by evaporator 116, and useful heating can be obtained from absorber 112, plus to some extent from condenser 113 as well.

Figure 2:
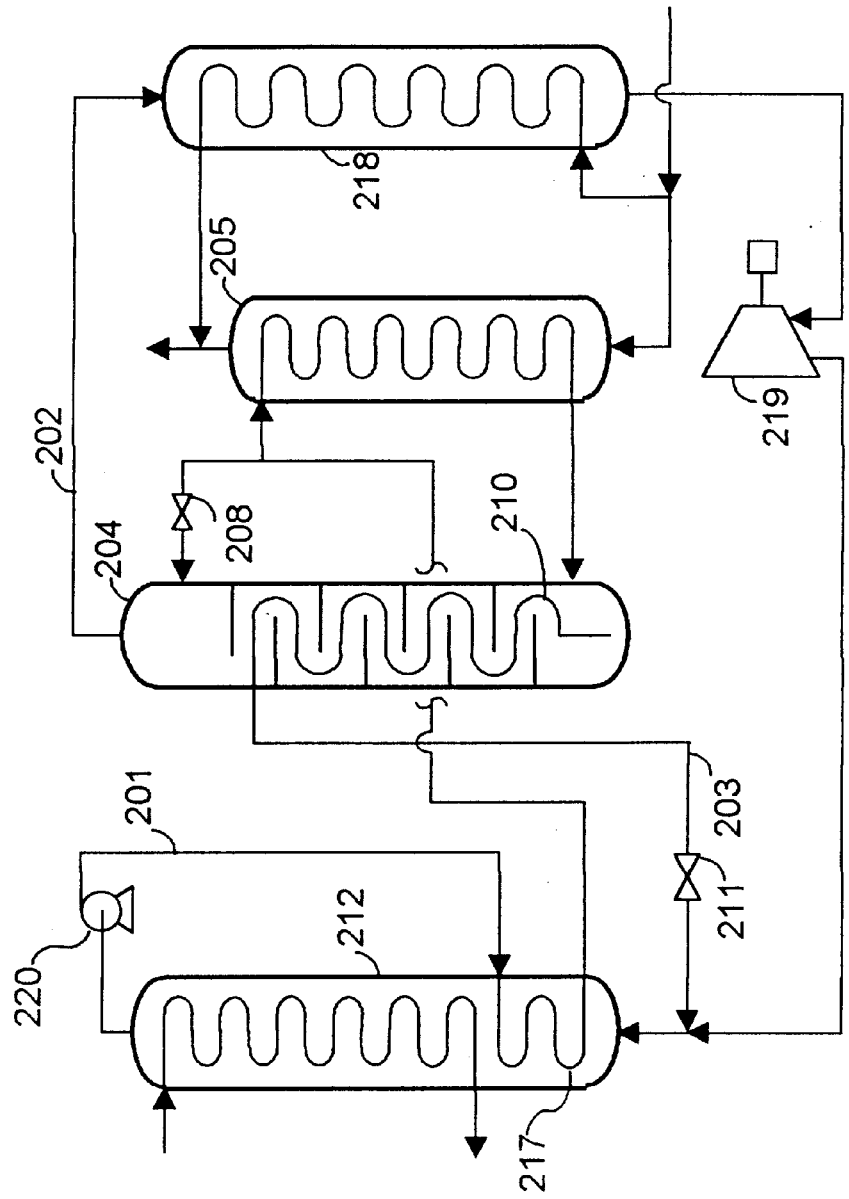
FIG. 2 illustrates an absorption power cycle which derives high power output from a glide heat source which heats desorber and superheater in parallel.

Referring to FIG. 2, weak absorbent solution in conduit 201 is separated into volatile component vapor of at least 95% purity in conduit 202 and strong absorbent liquid in conduit 203 by fractionating apparatus comprised of fractionating column 204 and co-current desorber 205. Preheater 217 (an "absorption heat exchanger" (AHX) in this example) heats the solution to near saturation temperature before it is divided by divider 208 into a reflux stream for column 204 and a feed stream for desorber 205. Desorbed mixture from desorber 205 is separated and fractionated in column 204 to bottom liquid and overhead vapor, and the bottom liquid causes additional reboil via heat exchange from GHX 210. Distilled vapor in conduit 202 is superheated in superheater 218 and work-expanded in expander 219. The superheating is done over the same approximate temperature range as desorption, i.e., desorber 205 and superheater 218 are heated in parallel, thus maximizing the temperature glide linearity. The expanded vapor is absorbed into the strong absorbent after pressure letdown by valve 211, in absorber 212, cooled both by external fluid in the colder section, and by absorbent in AHX 217. Pump 220 completes the absorbent cycle. The low temperature glide heat can be geothermal liquid, solar heated liquid, combustion exhaust gases, etc. Thus, a simple, economical, and highly efficient absorption power cycle is realized.

Figure 3:
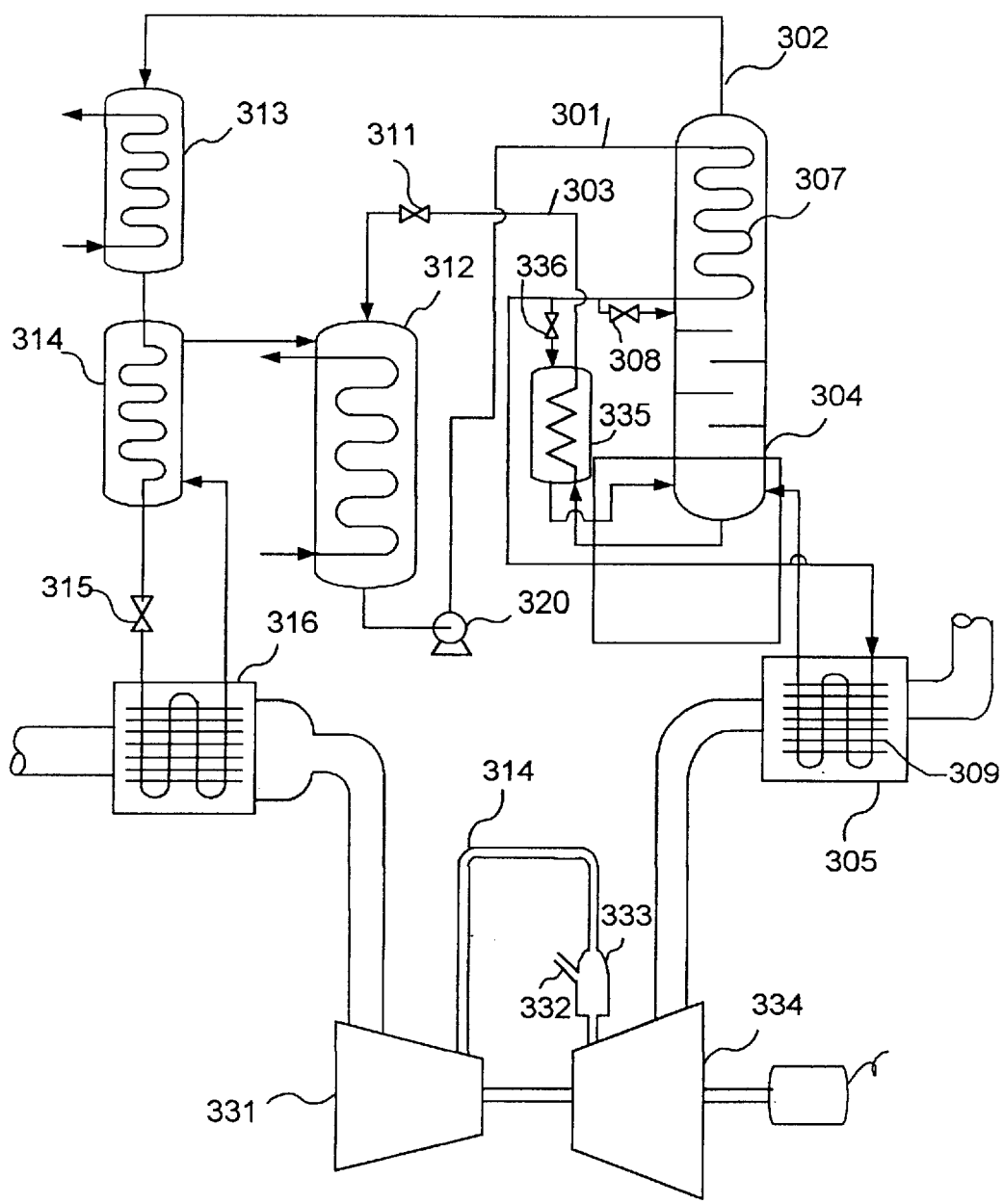
FIG. 3 illustrates an absorption refrigeration cycle heated by engine waste heat, where at least part of the refrigeration cools the engine inlet air.

Referring to FIG. 3, an absorption refrigeration cycle is integrated with a combustion engine such that engine waste heat powers the absorption cycle at HRVG 309, and the chilling from the absorption cycle cools engine inlet air at evaporator 316. The engine is comprised of compressor 331, combustor 333, and work expander (turbine) 334. The absorption cycle illustrates one variant from those of FIGS. 1 and 2—there is an external GHX 335 which supplies additional reboil to column 304 from an additional portion of the feed sorbent liquid, controlled by valve 336.

Figure 4:
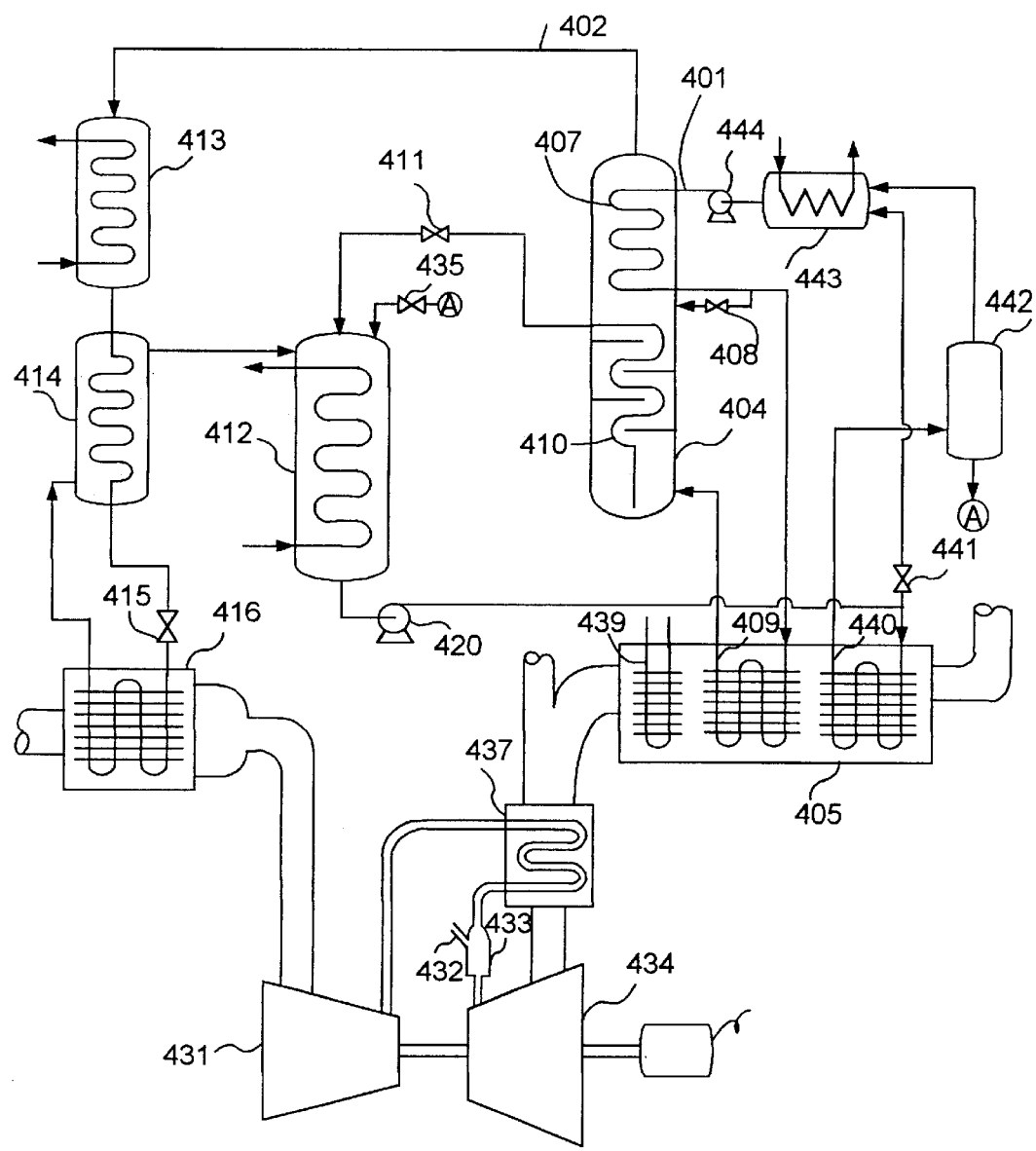
FIG. 4 illustrates a three-pressure absorption refrigeration cycle powered by low temperature glide heat from an engine.

Referring to FIG. 4, another variant of the absorption refrigeration unit (ARU) integrated with a combustion engine is illustrated. In this example, heat recovery steam generator 439 consumes much of the waste heat from turbine 434. Hence, in order to obtain sufficient chilling from the ARU, it is necessary to incorporate a second HRVG 440 which is at a lower temperature and pressure than primary HRVG 409. The remaining components necessary to utilize this even lower temperature portion of glide heat include vapor-liquid separator 442, intermediate pressure absorber 443, pump 444, flow divider 441, and IP letdown valve 445.

Figure 5:
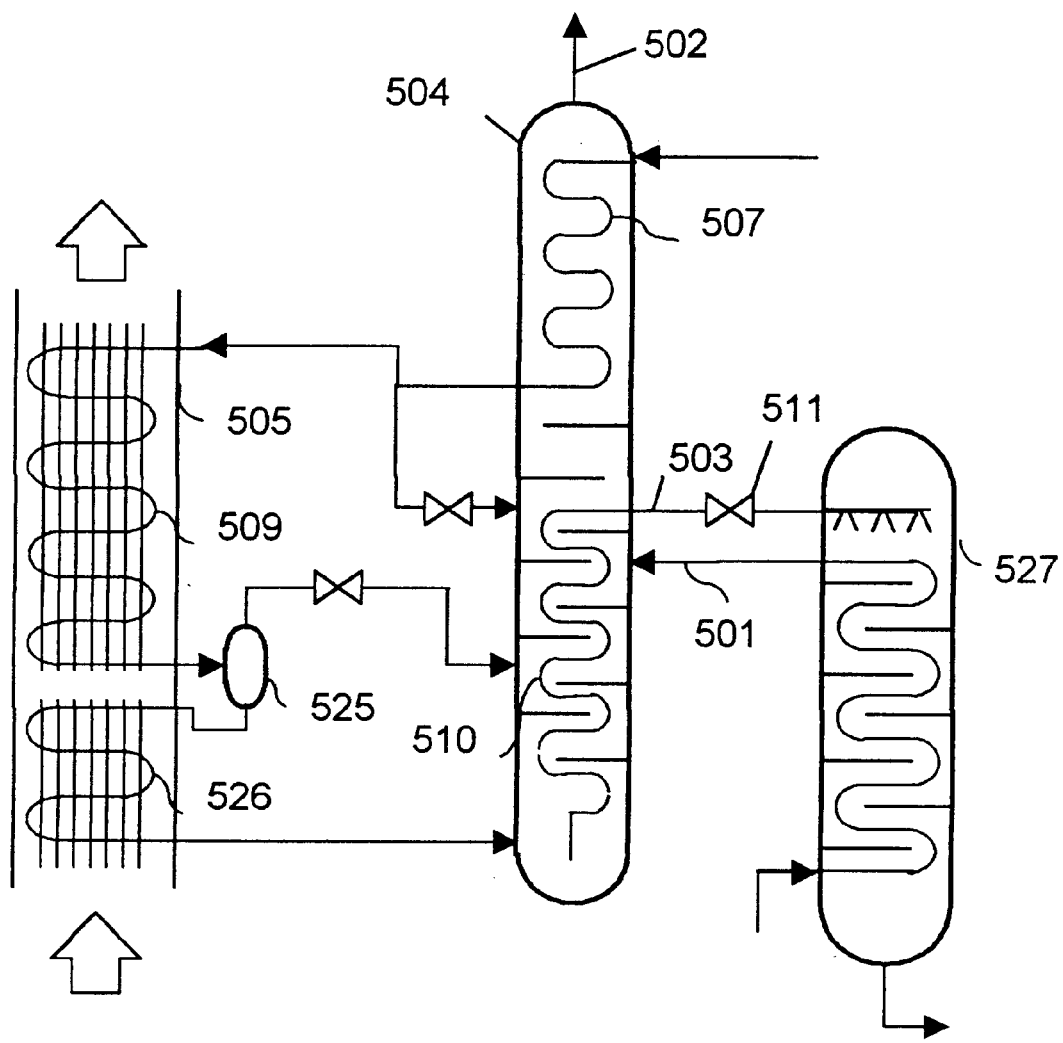
FIG. 5 illustrates a desorption/distillation of a fluid mixture using low temperature glide heat wherein there are two heat recovery vapor generators in series, and accordingly two reboils to the column from them, plus also a generator-absorber heat exchanger (GAX) reboil.

Referring to FIG. 5, a modification of the disclosed desorption/distillation system is presented which allows for a larger temperature glide. In the preceding figures, the desorption (generation heat recovery) step is always a partial evaporation, not total evaporation. Thus the temperature glide possible is always less than the dew point-bubble point difference. FIG. 5 illustrates one method for increasing that glide, to beyond even the dew point-bubble point difference, while still avoiding the problematic total evaporation. Much of the apparatus is common with earlier figures, i.e., column 504, solution-cooled rectifier (SCR) 507, GHX 510, HRVG 505 containing fin tubes 509, and solution letdown 511. The new features are the vapor-liquid separator 525 plus a second higher temperature HRVG 526. Separator 525 sends intermediate reboil to a mid height of column 504, and only the liquid continues to higher temperature desorption. Also illustrated in FIG. 5 is another means of obtaining additional reboil from the bottom liquid—GAX 527.

The desorption in the heat recovery vapor generator should be either cocurrent or crosscurrent mass exchange, to ensure higher transfer coefficients. The heat transfer should be either fully countercurrent or a hybrid of crosscurrent and countercurrent. The desorption is preferably downflow, to allow the desorber to automatically drain when the solution pump is off, thus avoiding need for a bypass damper.

As illustrated in the several figures, there are various options within the basic disclosure for sensibly heating and/or cooling the column liquids so as to achieve higher utilization of the low temperature glide heat. The GHX can be internal to the column or external. Preheating can be done by any of AHX, SCR, and SHX. The vapor-liquid separations can be in separate vessels, or in the sump of the column. Higher temperature heat input can be via a second HRVG as illustrated, or by other prior art methods, e.g. thermosyphons or integrated heating loops.

One preferred working pair for the cycle embodiment of this invention is ammonia-water. Other combinations of interest include $CO_2$ as sorbate and methanol, amine, or other known $CO_2$ sorbent; light hydrocarbon sorbate ($C_4$ or smaller) with heavy hydrocarbon sorbent ($C_8+$, e.g., alkylate or naphtha); and halocarbons as sorbate with known sorbents such as the glymes. In the distillation embodiment, any fluid mixture is contemplated.

What is claimed is:

1. An apparatus for distilling a fluid mixture using low temperature heat comprised of:
   a) a distillation column;
   b) a heat recovery vapor generator (HRVG);
   c) a splitter for the fluid mixture, which directs a minor fraction to the upper reflux portion of the distillation column, and the remainder to the heat recovery vapor generator;
   d) a flowpath for at least vapor from the HRVG to the lower portion of the distillation column; and
   e) a heat exchanger in the central portion of said column which is supplied column bottom liquid.

2. The apparatus according to claim 1 additionally comprised of a superheater for the column overhead vapor, a work expander for the superheated vapor, and an absorber which absorbs expanded vapor into column bottom liquid, thus cyclically obtaining said fluid mixture.

3. The apparatus according to claim 1 additionally comprised of an intermediate pressure, lower temperature HRVG and an intermediate pressure absorber, which use the same fluid mixture.

4. The apparatus according to claim 1 additionally comprised of a second HRVG which receives separated liquid from the first HRVG and which supplies reboil vapor to an even lower portion of said column.

5. The apparatus according to claim 1 wherein said HRVG incorporate non-cocurrent heat exchange and non-countercurrent mass exchange.

6. The apparatus according to claim 1 additionally comprised of an absorber which is partly cooled by absorbent solution.

7. The apparatus according to claim 6 wherein said absorbent solution is both sensibly heated and caused to desorb.

8. The apparatus according to claim 1 additionally comprised of a rectifying section in said distillation column above the reflux feed point, said rectifying section comprised of a heat exchanger which is supplied at least a portion of said fluid mixture, thereby preheating it.

9. The apparatus according to claim 8 additionally comprised of a condenser for overhead vapor from the column, an evaporator of liquid from the condenser, and an absorber which absorbs evaporated liquid into column bottom liquid, thus cyclically obtaining said fluid mixture.

10. The apparatus according to claim 9 adapted to provide useful refrigeration from the evaporator and useful heating from the absorber heat, and wherein the fluid mixture is aqueous ammonia.

11. The apparatus according to claim 10 wherein a combustion engine supplies heat to said HRVG and said evaporator supplies chilled air to said combustion engine.

12. An apparatus for separating a weak absorbent solution into strong absorbent liquid plus sorbate vapor using low temperature heat, comprised of:
   a) a co-current mass exchange desorber which is heated by said low temperature heat;
   b) a distillation column which receives reboil vapor from said desorber;
   c) a flow divider which routes one part of said weak absorbent to said desorber and another part to the upper portion of said column; and
   d) a rectifying section for said column which produces said sorbate vapor and is cooled by internal heat exchange with at least part of the weak absorbent.

13. The apparatus according to claim 12 wherein said desorber heat exchange is counter-current and the desorption is tubeside downflow.

14. The apparatus according to claim 12 additionally comprised of an internal heat exchanger in the central section of said column which is supplied bottom liquid.

15. The apparatus according to claim 12 additionally comprised of a recuperative desorber in which a third part of said weak absorbent is desorbed by heat exchange with column bottom liquid.

16. The apparatus according to claim 12 in an absorption refrigeration cycle apparatus which is additionally comprised of a condenser for said sorbate vapor, an evaporator which produces refrigeration by evaporating condensed sorbate, and an absorber in which evaporated sorbate is absorbed in bottom liquid from the column, to make said weak absorbent.

17. The apparatus according to claim 12 in an absorption power cycle apparatus which is additionally comprised of a superheater for said sorbate vapor which is heated in parallel with said desorber, and a work expander for said superheated vapor.

18. The apparatus according to claim 12 additionally comprised of a second desorber which accomplishes further separation of said weak absorbent solution from said low temperature heat.

19. A process for distilling a fluid mixture with a low temperature heat source comprising:
   a) desorbing a major fraction of said fluid mixture by counter-currently exchanging heat with said low temperature heat;
   b) distilling the desorbed vapor;
   c) refluxing said distilling step with a minor fraction of said fluid mixture; and
   d) using distillate liquid to accomplish additional distillation by transferring heat from said liquid to produce additional reboiling.

20. The process according to claim 19 additionally comprising producing at least one of refrigeration and power from said distilled vapor.

* * * * *